(No Model.) 3 Sheets—Sheet 1.

W. R. FEE & J. S. ZERBE.
COTTON SEED HULLER.

No. 404,696. Patented June 4, 1889.

WITNESSES:
Robert Kirk.
Dugald McKillop

INVENTOR
W<sup>m</sup> R. Fee
J. S. Zerbe
By J. S. Zerbe
Attorney.

(No Model.) 3 Sheets—Sheet 2.
W. R. FEE & J. S. ZERBE.
COTTON SEED HULLER.
No. 404,696. Patented June 4, 1889.
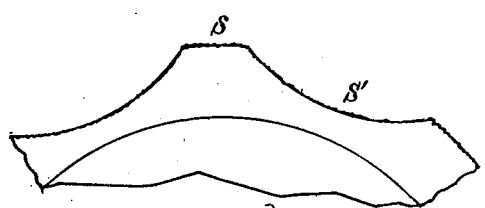
Fig. 8.
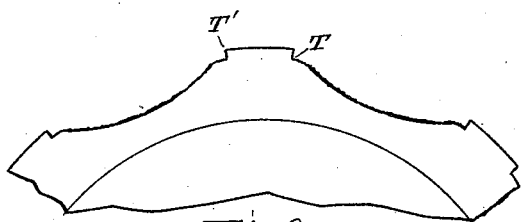
Fig. 9.
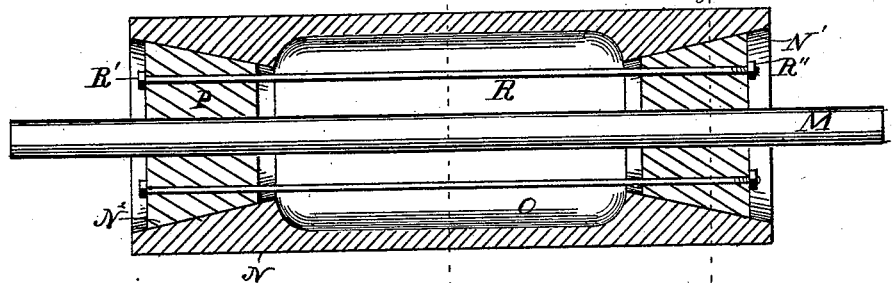
Fig. 4.
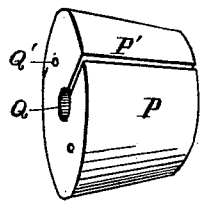
Fig. 5.
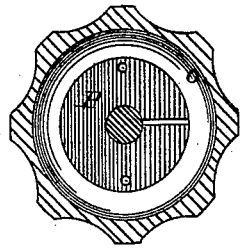
Fig. 6.
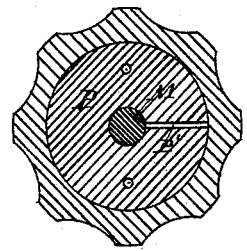
Fig. 7.
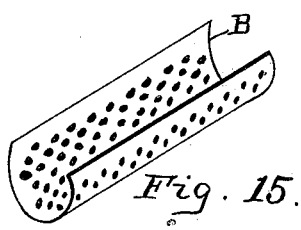
Fig. 15.
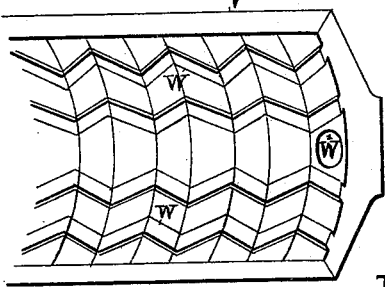
Fig. 14.
WITNESSES:
Robert Kirk
Dugald McKillop
INVENTOR:
Wm. R. Fee
J. S. Zerbe
By 
Attorney.

(No Model.) 3 Sheets—Sheet 3.

W. R. FEE & J. S. ZERBE.
COTTON SEED HULLER.

No. 404,696. Patented June 4, 1889.

WITNESSES:
Robert Kirk
Dugald McKillop

INVENTOR:
Wm R. Fee
J. S. Zerbe
By J. S. Zerbe
Attorney.

UNITED STATES PATENT OFFICE.

WILLIAM R. FEE, OF CINCINNATI, AND JAMES S. ZERBE, OF HARTWELL, OHIO, ASSIGNORS, BY MESNE ASSIGNMENTS, TO THE NATIONAL COTTON SEED OIL AND HULLER COMPANY, OF MEMPHIS, TENNESSEE.

COTTON-SEED HULLER.

SPECIFICATION forming part of Letters Patent No. 404,696, dated June 4, 1889.

Application filed September 2, 1885. Serial No. 176,022. (No model.)

*To all whom it may concern:*

Be it known that we, WILLIAM R. FEE, of the city of Cincinnati, county of Hamilton, and State of Ohio, and JAMES S. ZERBE, of Hartwell, in the county of Hamilton and State of Ohio, have invented certain new and useful Improvements in Cotton-Seed Hullers, which improvements are fully set forth in the following specification and the accompanying drawings.

Figure 1:
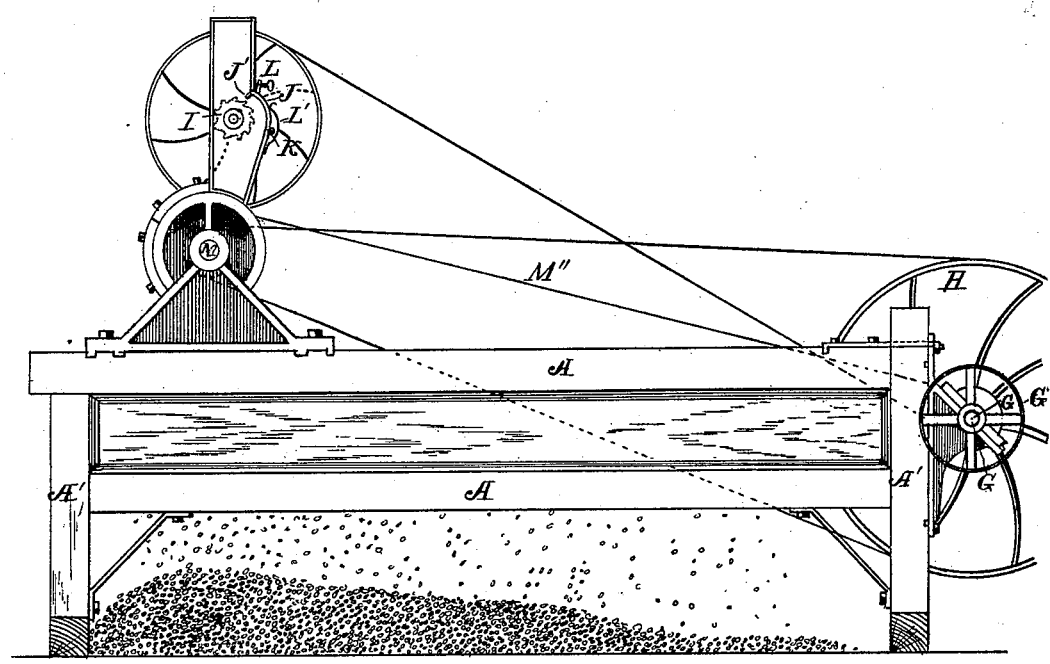
Figure 2:
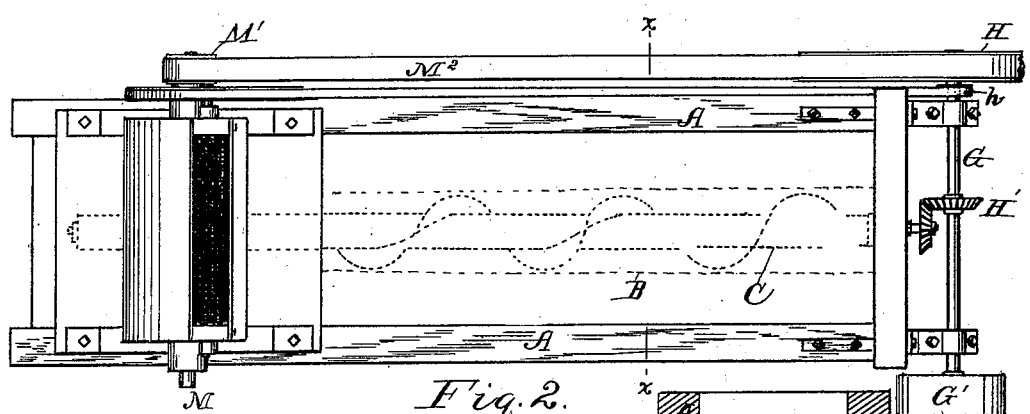
Figure 3:
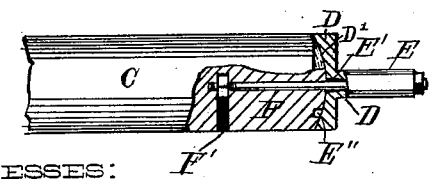
Figure 13:
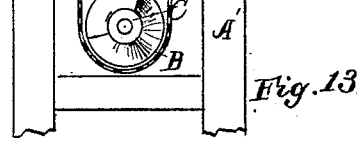
Figure 10:
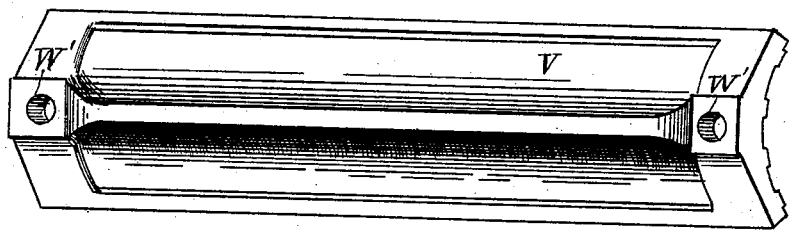
Figure 11:
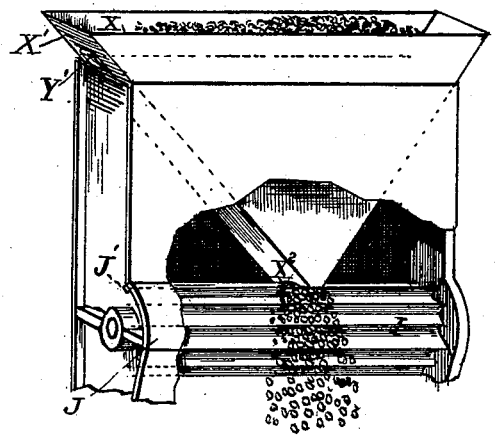
Figure 12:
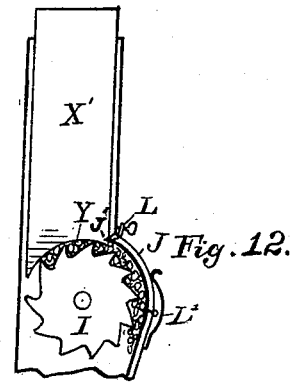

Figure 1 is a side elevation of our improved machine. Fig. 2 is a top or plan view of the same. Fig. 3 is a detail view showing the means for adjustably attaching the conveyer-shaft. Fig. 4 is a central longitudinal section of the reversible hulling-cylinder, illustrating the means for securing it upon its shaft. Fig. 5 is a perspective view of one of the conical blocks for mounting the hulling-cylinder upon its shaft. Fig. 6 is a transverse sectional view of the cylinder before it is dressed, taken through line $xx$ of Fig. 4. Fig. 7 is a similar view through line $yy$ of Fig. 4. Fig. 8 is a detached fragment of the cylinder in end elevation and enlarged before it is dressed. Fig. 9 is a similar view after the cylinder is dressed. Fig. 10 is a perspective view looking from the convex side of one stave or section of the concave. Fig. 11 is a perspective view of the permanent hopper and a removable hopper placed upon or within it. Fig. 12 is an end elevation of the view shown in Fig. 11 with the end casing removed. Fig. 13 is a detail view in vertical transverse section taken in line $xx$ of Fig. 2. Fig. 14 is an enlarged detail view in perspective of one stave or section of the concave, looking at the concave side, the reverse side from that shown in Fig. 10. Fig. 15 is a perspective view of the U-shaped perforated metal screen which incloses the conveyer-shaft.

Our invention is an improved cotton-seed huller and separator. Its object is to provide an improved hulling-cylinder, and also means for mounting the same upon its shaft, so that it may be readily removed, reversed, and replaced.

It also consists in an improved concave, which, coacting with the cylinder, may be used without change for grinding corn as well as for hulling cotton-seed.

It also consists in certain improvements in the separator and its shaft and the arrangement of the separator with relation to the huller.

It finally consists in certain peculiar arrangements and combination of parts, all of which will be first fully described in connection with the accompanying drawings, and then particularly referred to and pointed out in the claims.

In the several figures of the drawings corresponding parts are indicated by similar reference-letters.

The frame upon which the operative parts of the machine are mounted consists of the four horizontal beams A, which are framed into the four upright posts A'. The frame formed by the beams A is closed upon the top. To the under side of this frame is secured a U-shaped perforated metal screen B, within which the conveyer-shaft C is mounted to revolve. Said shaft is provided with a number of spiral flights C', which as the shaft C revolves carry the broken seed from the receiving to the discharge end of the machine, and, acting in the double capacity of separator and conveyer, in combination with the inclosed casing, cause the separated kernels to be discharged through the perforated screen B as they are conveyed forward, the greater portion being discharged near the receiving end, and the less easily separated or less perfectly broken being carried along and separated by the action of the flights until at the tail end of the machine only the broken hulls and lint remain in the screen, as clearly shown in Fig. 1, to be discharged at the tail end of the machine.

The ends of conveyer-shaft C are turned off slightly convex to receive the concave seats in the gudgeons D, which carry the journals E, upon which the shaft revolves. The journals have tapering bores E' to receive bolts F. The end of the shaft C is bored out to meet an aperture at right angles to it, in which aperture is a nut to receive the screw-threaded end of the bolt F for the purpose of tightening the gudgeons D against the end of the shaft C. The concave face of the gudgeon has a lug or pin E″ projecting from it into the shaft to prevent either turning independent of the other.

Upon one end of the frame A A′ is mounted the huller, and upon the top of this the hopper and feed-roll within it, which, in combination with the separator mounted in or upon the same frame, comprises a single machine which performs all the operations of hulling the seed and separating the hulls and lint from the kernels.

There are two hoppers shown, the permanent one J, which is employed when the machine is used for cotton-seed, and the tapering removable one X, which is employed should it be desirable to use the machine for grinding corn, to which use it is also adapted by reason of the peculiar construction and arrangement of the hulling-cylinder and concave, as will be explained hereinafter.

The permanent hopper is provided with a feed-roll I, which is located just below its parallel walls.

The rear of the hopper is provided with a gate J, which is hinged at K and provided with an inwardly-projecting flange J′, which is adjustable nearer to or farther from the feed-roll I by the set-screw L. A curved spring L′ has its lower end secured to the wall of the hopper. Its upper end presses against the gate J and holds the gate closed with elastic pressure, allowing it to yield should the seed tend to clog the feed-roll. By turning the feed-screw L the operator may regulate the feed according to the speed of the machine or the condition of the seed under treatment.

The hulling-cylinder N is a hollow shell cast in a single piece. The interior at each end is made tapering inward, as shown at N′, and the bore between the inclines at the ends is enlarged, forming the chamber O, so as to save metal and provide against unequal shrinkage. The cylinder is mounted and secured upon its shaft M by the frusto-conical blocks P, which are bored out to fit the shaft M, and have their exteriors dressed to match into the tapering ends of the cylinder. These blocks P are bored, as seen at Q, so as to freely slip over the shaft, and are slit through from the periphery to their central bores, as shown at P′, Figs. 5, 6, and 7, so that the opposite blocks are drawn in the direction of each other by the through-bolts R R′ and nut R″. The bolts pass through holes Q″ in the plugs P, as clearly shown in Fig. 4. The plugs P will be firmly clamped upon the shaft M and held to it by frictional contact.

Upon the cylinder N is cast a series of ribs S. The spaces or depressions between the ribs are simple curves S′. When the casting leaves the sand, the edges are rough, as seen in Fig. 8. The cylinder is finished for use by centering it in a lathe and grinding the faces of the ribs smooth by emery-wheels, after which the shoulders T are formed upon each side of the ribs by an emery-wheel, forming practically cutting-edges. By reason of the circular depressions between the ribs but little metal need be removed, and the face of the ribs being broad they can be repeatedly sharpened, so that the cylinder will last a long time. Another advantage incident to the peculiar means for mounting the cylinder is that it can be readily removed and replaced or reversed when desired, so that the wear of the ribs is even, and that when the cylinder is once mounted the following as well as the leading edges may be sharpened, the following edges when the cylinder is reversed end for end becoming the leading or cutting edges. Thus one-half of the labor of mounting the cylinder to be sharpened is saved. Another advantage is that as both edges of the emery-wheel are used in sharpening both sides of the ribs it will wear evenly until worn out, thus saving the time and trouble usually necessary to keep the wheel in working shape when only one edge is used.

The concave V, Figs. 10 and 14, is built up, preferably, of sections, and its inwardly-projecting ribs W are arranged in zigzag shape and in alternate pairs, preferably two pairs upon each stave or quarter, as clearly shown in Fig. 14. The two lines of ribs of each pair are parallel to each other, while each alternate pair is inversely arranged with relation to the pair next to it—that is, the spaces between the alternate pairs are rectangular or diamond-shaped, instead of parallel, as between the adjacent ribs of each pair. We find that by so arranging the ribs upon the concave, in combination with the straight ribs upon the hulling-cylinder, the huller performs its work more satisfactorily as a cotton-seed huller, and at the same time is rendered effective as a corn-grinder should it be desirable to use the machine as such. Each stave or section of the concave has holes W′ formed in it to receive the bolts by which the staves are secured in position.

When it is desired to use the huller for grinding corn, the removable hopper X is placed in the position shown in Fig. 11, the conveying or V ends X′ coming close together just above the feed-roll I. The lower edges of these pieces are cut out, as shown at X″, to nearly conform to the shape of the feed-roll I. A wedge Y′ is used between the upper edge of the permanent hopper and the inclined ends X′ of the removable hopper for the purpose of adjusting the said movable hopper to the proper position.

The machine is driven from a counter-shaft G at the rear end of the machine, upon which is secured a pulley G′, which receives power from the engine or other source of supply. Upon the opposite end of the shaft G is a larger pulley H, which transmits power to the huller-cylinder, and alongside of this pulley, upon the same shaft, is a smaller pulley h, which transmits through belt M″ motion to the feed-roll I. Upon the same shaft G is also secured a beveled pinion H', which meshes with a similar pinion which is secured upon the end of the journal E of the conveyer-shaft C.

What we claim as new is—

1. The combination, substantially as hereinbefore set forth, in a cotton-seed huller, of the hopper, the fluted feed-roll mounted to revolve therein, a hinged gate having a flange projecting inward in the direction of and above the feed-roll, and a set-screw for adjusting said flange with relation to the feed-roll, so as to regulate the feed from the hopper.

2. The conveyer-shaft C, having its ends convexed, in combination with gudgeons D, having concaved seats and provided with tapering bores, and adjusting-rods for adjustably securing said gudgeons to the end of the shaft, substantially as set forth.

3. The hollow cylinder N, cast in one piece, having ribs S, and curved depressions between said ribs and shoulders or offsets T, forming cutting-edges upon said ribs, substantially as set forth.

4. A concave V for cotton-seed hullers, substantially as hereinbefore set forth, having zigzag ribs W, arranged in pairs, as shown, the ribs of each pair being parallel with each other and the ribs of each pair being arranged at an angle to the ribs of the adjacent pair.

5. The combination, substantially as specified, in a cotton-seed huller, of the hollow hulling-cylinder having longitudinal ribs S and the concave V, having zigzag ribs arranged in pairs, as shown, the line of the ribs of each pair being parallel to each other and at an angle to the line of the pair adjacent.

6. The combination, substantially as specified, of the reversible hulling-cylinder having ribs S, intervening depressions S', and shoulders T, forming edges upon each side of the ribs, and the concave V, having zigzag ribs W.

7. In a cotton-seed huller, the combination, substantially as specified, of the frame A A', the separator consisting of the perforated screen B and separator-shaft within it mounted in said frame, the huller consisting of the hulling-cylinder and its concave mounted upon said separator, the hopper and its fluted feed-roll mounted upon the huller, and suitable means, such as shown, to transmit power from the same shaft to the feed-roll, huller, and separator.

In testimony that we claim the foregoing we have hereunto set our hands, this 28th day of August, 1885, in the presence of witnesses.

WILLIAM R. FEE.
JAMES S. ZERBE.

Witnesses:
E. VON MARTELS,
P. P. CASEY.